US007796029B2

(12) United States Patent
Ma et al.

(10) Patent No.: US 7,796,029 B2
(45) Date of Patent: Sep. 14, 2010

(54) EVENT DETECTION SYSTEM USING ELECTRONIC TRACKING DEVICES AND VIDEO DEVICES

(75) Inventors: Yunqian Ma, Roseville, MN (US); Rand P. Whillock, North Oaks, MN (US); Bruce W. Anderson, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 448 days.

(21) Appl. No.: 11/823,166

(22) Filed: Jun. 27, 2007

(65) Prior Publication Data

US 2009/0002155 A1 Jan. 1, 2009

(51) Int. Cl.
*G08B 1/08* (2006.01)
*H04N 7/18* (2006.01)
*G06K 9/00* (2006.01)

(52) U.S. Cl. ............................ 340/539.25; 340/539.13; 340/522; 340/572.1; 340/5.81; 348/135; 348/143; 382/103; 382/115

(58) Field of Classification Search ............. 340/539.25
See application file for complete search history.

(56) References Cited

U.S. PATENT DOCUMENTS

| | | | | |
|---|---|---|---|---|
| 6,791,603 | B2 * | 9/2004 | Lazo et al. | 348/169 |
| 6,987,451 | B2 * | 1/2006 | McKeown et al. | 340/541 |
| 6,998,987 | B2 * | 2/2006 | Lin | 340/573.1 |
| 7,149,325 | B2 * | 12/2006 | Pavlidis et al. | 382/103 |
| 7,327,383 | B2 * | 2/2008 | Valleriano et al. | 348/143 |
| 7,359,836 | B2 * | 4/2008 | Wren et al. | 702/189 |
| 2005/0128293 | A1 * | 6/2005 | Wilsey et al. | 348/143 |
| 2006/0028552 | A1 * | 2/2006 | Aggarwal et al. | 348/169 |

FOREIGN PATENT DOCUMENTS

| | | |
|---|---|---|
| CA | 2454885 | 7/2004 |
| JP | 2007128390 | 5/2007 |

* cited by examiner

*Primary Examiner*—Donnie L Crosland
(74) *Attorney, Agent, or Firm*—Schwegman, Lundberg & Woessner, P.A.

(57) ABSTRACT

An event detection system includes a processor, an electronic tracking device, and one or more transmitters. Each of the one or more transmitters can be configured to be associated with a particular individual of a group of individuals. The processor can be configured to cluster data from the one or more transmitters, and the processor can be configured to analyze the clustered data to determine one or more behavior patterns among the group of individuals. In an embodiment, video data can be combined with the electronic tracking device data in the event detection system.

15 Claims, 5 Drawing Sheets

EVENT DETECTION SYSTEM USING ELECTRONIC TRACKING DEVICES AND VIDEO DEVICES

TECHNICAL FIELD

Various embodiments relate to an event detection system, and in an embodiment, but not by way of limitation, an event detection system that uses electronic tracking devices.

BACKGROUND

Radio Frequency Identification (RFID) systems have been used for many years for tracking assets, inventory, cargo and persons. In most applications, RFID is used to accurately locate the "tagged" item for inventory control or storage location. In the case of tracking personnel, the "tagged" item is a person that the user must locate in case of emergency or for the control of restricted areas or loitering. RFID systems map the location of each RFID tag, tying it to the location of the nearest reader. Such systems are used in hospitals to track and locate patients to make sure they are not in unauthorized areas, and such systems are also used in prisons for hand-free access control and prisoner location.

Similarly, video surveillance has been used extensively by commercial and industrial entities, the military, police, and government agencies for event detection purposes—such as security monitors in a shopping mall, a parking garage, or a correctional facility. Years ago, video surveillance involved simple closed circuit television images in an analog format in combination with the human monitoring thereof. Video surveillance has since progressed to the capture of images, the digitization of those images, the analysis of those images, and the prediction and the response to events in those images based on that analysis.

DETAILED DESCRIPTION

Figure 1:
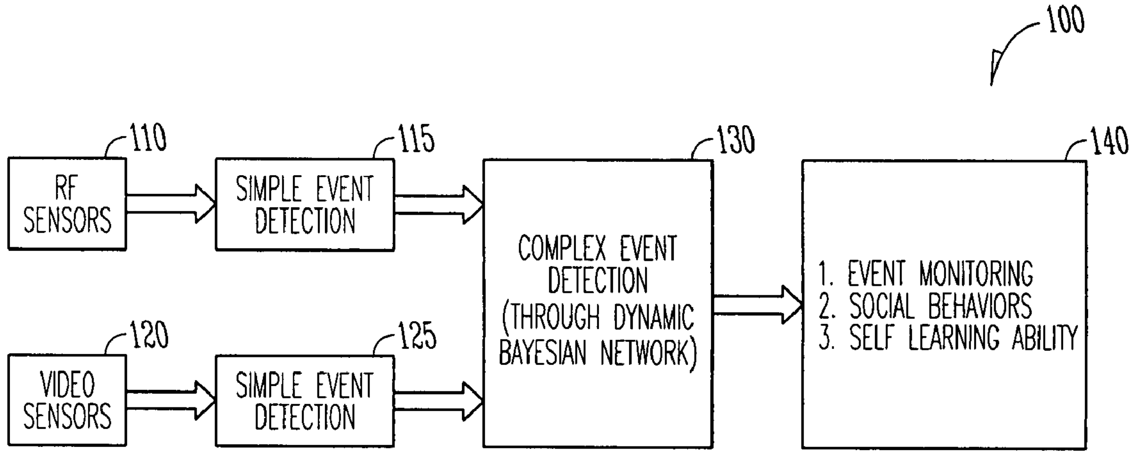
FIG. 1 illustrates a flowchart of an example embodiment of a process to detect events, monitor events, and identify social behaviors using electronic tracking data and video data.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The need for high security and event monitoring in different environments is increasing, but tactics, training, and technologies have not kept pace with this need. For example, in prison and other correctional facility environments, behavior awareness is hampered by short lines of sight, cluttered and dynamically changing environments, and large populations. Even with corrections officers on constant surveillance in person or through video cameras, many unlawful activities can occur. Gang activities, drug deals, fights, and other undesirable activities could be better controlled with the use of automated event detection technologies. Consequently, one or more embodiments relate to an automated event monitoring system that uses an electronic tracking system such as a Radio Frequency Identification (RFID) system and video monitoring technologies to detect and log events and behaviors of interest within a correctional facility. As an example, two types of sensor modalities are disclosed herein—an RFID system and a video system. The use of data mining and computer vision to automatically process a wide array of sensor data can result in significant improvements in monitoring secure areas and planning and executing operations in these environments. While embodiments are described primarily using RFID technology and video technology in a correctional environment, it is noted that this is only for illustrative purposes, and further embodiments are not limited by these examples.

While the detection range of RFID sensors may not permit continuous subject or object tracking, RFID sensors at strategic choke points can detect and report the movement of people and assets. On the other hand, the relatively short range of RFID sensors implies that the location of an RFID event is relatively precise. RFID information can be used to confirm identity reports from sources such as video or audio and can be used to identify individual members in groups that are sufficiently dense to defy identification by other means. RFID tags are inexpensive enough that they can be embedded in common objects at manufacture. Embedded tags can be extremely difficult to separate from the object, thus providing a reasonable assurance that an RFID alert corresponds to the actual presence of the object. When RFID readers and tags are used together with video or access control systems, algorithms that detect loitering, clustering, and crowd control can be employed to determine who is at a particular location at a particular time.

Regarding video sensor systems, a variety of algorithms detect low-level features in video, including motion and object detection and object tracking. These low-level features allow one to perform high-level activity recognition (e.g., threats) in, for example prisons, hospitals, and banks. Activity recognition classifies semantic activity based on features from low-level video processing.

Besides atomic activity recognition, more complex behaviors such as fighting can be identified in video sensor systems. Complex events are typically composed of several simple events that occur in sequence. Often, only slight variations in sequences distinguish one complex event from another. For example, events in a retail store may be identified using just three categories—that is, buying items, stealing items, and browsing for items. These events could be decomposed into lower-level events. Buying an item could consist of holding an item, taking the item to a cashier, paying for the item, accepting a receipt, and leaving the premises. By comparison, stealing an item would not include the middle three events. The decomposition of complex events into sequences of simpler events lends to a hierarchical representation of events.

Detecting and analyzing meaningful events could include simultaneous bottom-up and top-down methods. A bottom-up method processes data from various sensors. A top-down method includes behavior definition and specification and uses probabilistic inference to set priors to define the task context.

In an embodiment, as illustrated in FIG. 1, a system 100 includes RFID sensors 110 that feed a simple RFID event detection block 115 and video sensors 120 that feed a simple video event detection block 125. At 130, a complex event detection scheme based on a dynamic Bayesian network model fuses the simple events from the RFID and video sensors. The monitored events are categorized as either specific events or longer term behaviors at 140. Specific events will include such incidents as fights, mobbing behaviors, and entry into restricted areas. Longer term behaviors that can be monitored include group memberships and roles (e.g., who is really in charge of a group or a gang) and possible drug deals (one person visiting many repeat customers for short time periods). A feature of the system is that it is adaptive, so that the specific types of monitored events can be learned. The details of such an adaptive system can be found in U.S. application Ser. No. 11/343,658, which is incorporated in its entirety by reference. Such learning systems can also be configured to detect patterns in real-time operation.

When associated with other systems, RFID tags can be used to track movements, detect crowds and associate who is in a restricted area or an area of suspicious activity. The basic tag is a simple RF radio that transmits a single identification number that can be attached to a prisoner or other person or object of interest using a tamper-proof band. RFID tags typically operate at 125 Khz, 315 MHz, 433 Mhz or 2.4 Ghz to minimize loss through objects such as walls or humans. The range of a typical active RFID tag is approximately 50 feet from the RFID receiver. In most cases, the range of the RFID system is reduced in access control systems. In outdoor applications, the range can be maximized through the selection of an antenna type.

A simple RFID event is a three tuple—that is, an identifier, a location, and a time. These events can be clustered on any of these attributes to infer interesting complex events. Clustering on the basis of an identifier tracks the movement of a subject or an object in an environment. Clustering on the basis of location can be used to estimate the size and composition of groups. Clustering on the basis of time can point to the existence of coordinated activities. More complex analyses can search for and analyze significant event sequences that can be used to predict the outcome of an ongoing activity.

RFID data can be aggregated to detect unusual or unauthorized associations between subjects and/or objects. For example, analysis of RFID data from tags on objects could show when certain objects are in the wrong location or with the wrong person. This is especially useful when this information is combined with video or other sensor data and is analyzed in the context of a current facility status (e.g., day, night, meal time, recreational period, etc.). Another interesting inference occurs when an object is first associated with one subject, and then with another subject, thereby indicating that the object has been passed from one subject to another.

The system can also perform inferences on features from a video stream from the video sensor. Typically, these observations can be represented as a continuous-valued feature-vector $y_t^{LL}$ from a Gaussian distribution.

Figure 2:
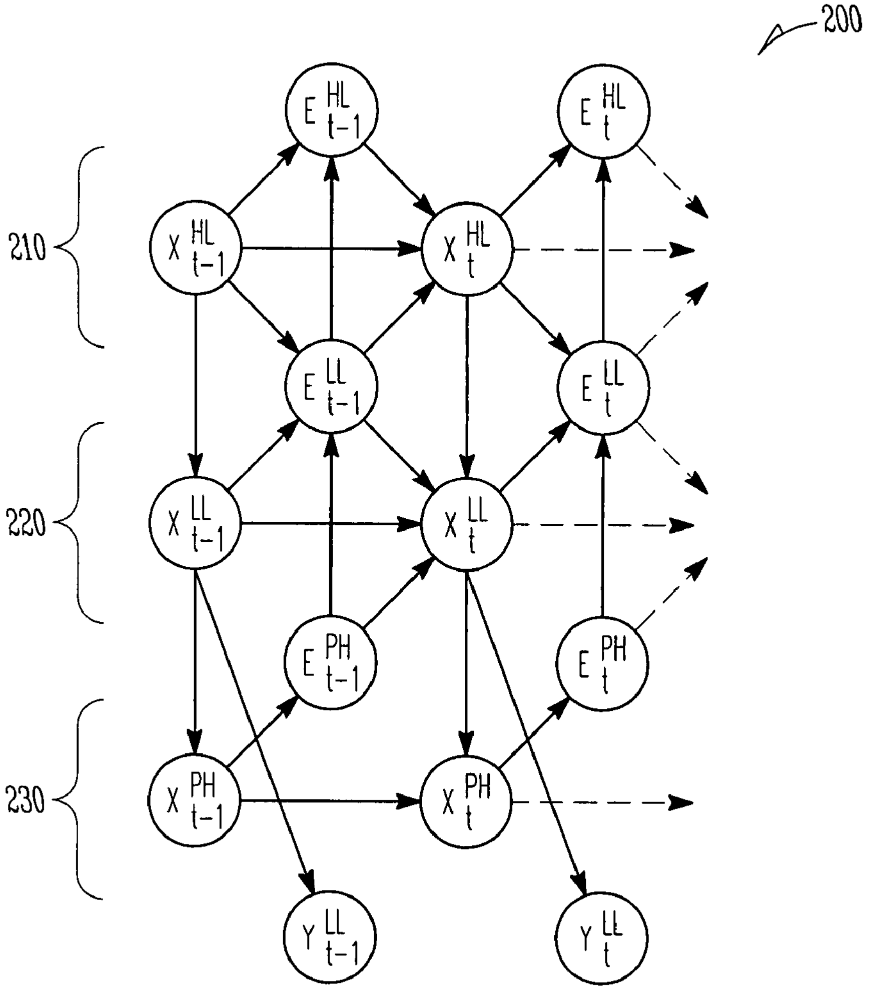
FIG. 2 illustrates an example embodiment of a dynamic Bayesian network.

To fuse the simple events from RFID sensors with simple events from video sensors, a registration and synchronization are first performed. These are simply a recording of data from the RFID and video sensors and a synchronization of that data. In an embodiment, after registration and synchronization, a multi-level Hierarchical dynamic Bayesian network-based method is used. An example of such a network 200 is illustrated in FIG. 2. The first level $X_t^{HL}$ (210) represents complex events (activity) that the system is attempting to classify. The number of states for the complex events depends on the particular domain. The second level $X_t^{LL}$ (220) represents the simple events (activities) that are generating observations. The simple events come from both the RFID and the video sensors. The simple events have an observed variable, $Y_t^{LL}$, that depends on the simple events. The last level, $X_t^{PH}$, (230) represents further subdivisions of the simple events activity and serves as a duration model for the simple event. Binary value $E^{LL}$ represents whether or not the simple event $X_t^{LL}$ is finished. Binary value $E^{HL}$ represents whether or not the complex event $X_t^{HL}$ is finished.

Figure 3:
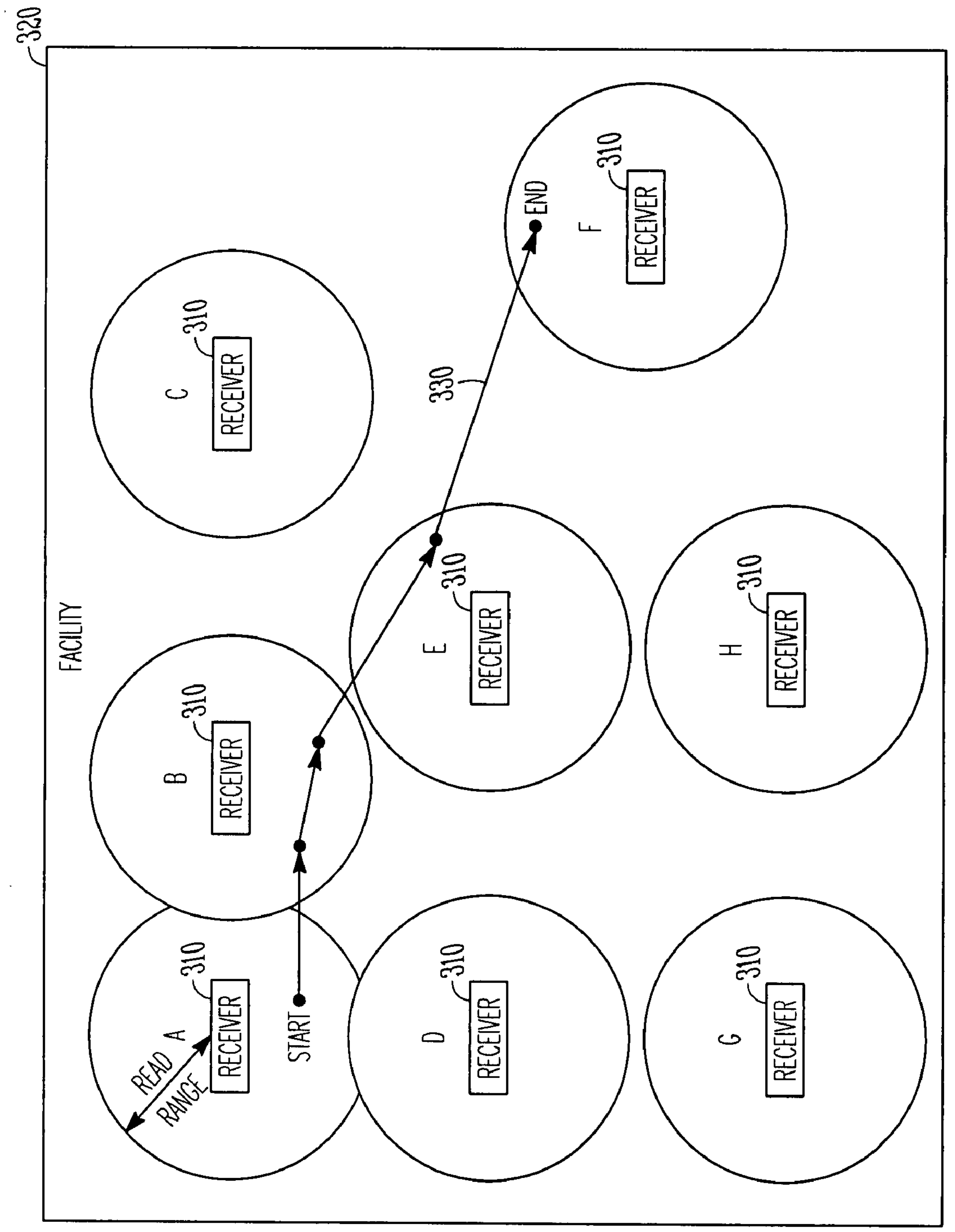
FIG. 3 illustrates an example embodiment of a plurality of receivers positioned in a facility or area.

FIG. 3 illustrates an example of a plurality of electronic tracking device receivers 310 positioned in a facility or area 320. Each receiver 310 has a particular range, and the range of each receiver 310 is defined by its area of reception. The areas of reception are illustrated in FIG. 3 as circles labeled A, B, C, D, E, F, G, and H. The regions in an area 320 may not be perfect circles due to interfering structures, and can either overlap or not overlap. For example, regions B and D both overlap with region A in FIG. 3. In FIG. 3, a simple event can be defined for example as a person being in one of the regions at a specific time. A complex event in FIG. 3 could be defined as a person moving through several regions, such as a person moving through regions A, B, E, and F as illustrated by trajectory 330 in FIG. 3.

The receivers 310 can be associated with level 230 of FIG. 2, the simple events with level 220, and the complex events with level 210. If the receivers being used are electronic tracking devices, then the electronic tracking devices are associated with level 230 of FIG. 2. The data in a dynamic Bayesian network, such as the dynamic Bayesian network 200 of FIG. 2, can include only electronic tracking device data, only video sensor data, or both electronic tracking device and video sensor data. When the data is only electronic tracking device data, the receiver is a the lowest level (230) in the dynamic Bayesian network, the simple events (such a being in a particular region) are at the next level (220), and a complex event such as a trajectory through several regions can be represented by the complex level (210). Similarly, when the data is only video data, the video sensing device is at the lowest level (230), the detection of simple events can be at the next level (220), and the identification of a complex event can be at the complex level (210). When electronic tracking device data and video sensor data are fused into a dynamic Bayesian network, an intersection of electronic tracking simple events and video sensor simple events can be used, a union of electronic tracking simple events and video sensor simple events can be used, or some other logical operation on the data can be performed to fuse the electronic tracking data's simple event and the video data's simple event.

In an embodiment, an event detection system includes a self-learning capability. The system can perform new spatial/temporal pattern discovery as unsupervised learning so that it can detect the patterns later in real-time system operation. For simple new events, a particular event is described as a point cloud in the feature space, and different events can be described by different point clouds. For complex new events, anomaly detection is first performed, and then the anomaly events are aggregated for self-learning activity recognition using a dynamic Bayesian network. The details of such a system with self-learning capabilities can be found in U.S.

application Ser. No. 11/343,658, which was previously incorporated in its entirety by reference.

Figure 4:
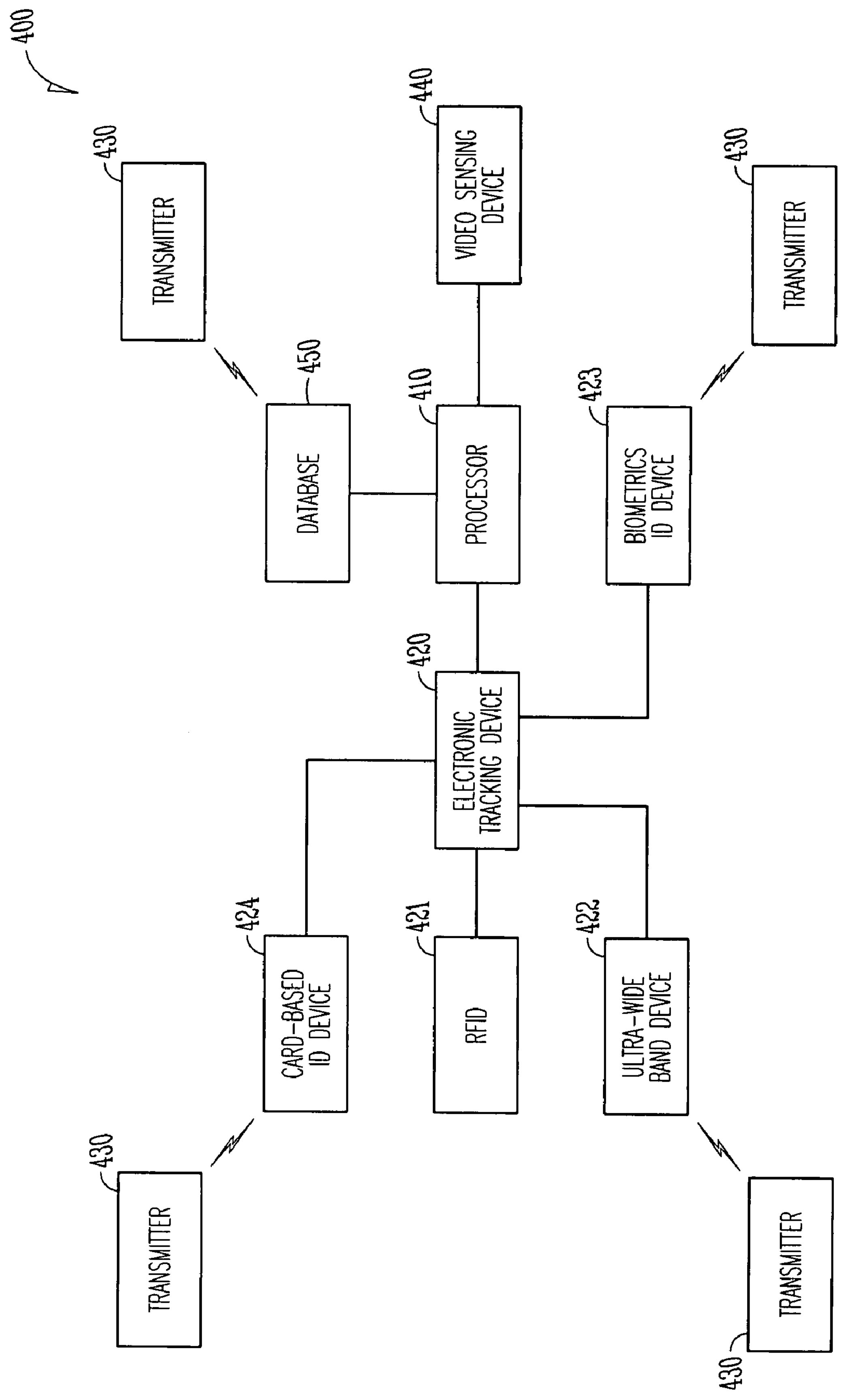
FIG. 4 illustrates a block diagram of an example embodiment of an event detection system.

FIG. 4 illustrates a block diagram of an example embodiment of an event detection system 400 that uses both electronic tracking data and video data. The system 400 includes a processor 410, and an electronic tracking device 420 that is coupled to the processor 410. The electronic tracking device 420 may include a radio frequency identification device 421, an ultra-wide band device 422, a biometrics identification device 423, and a card-based identification device 424. The system 400 further includes a plurality of transmitters 430. The electronic tracking device 420 is configured to read data from the plurality of transmitters 430. Each one of the transmitters 430 is associated with a particular individual out of a group of individuals. In another embodiment, each of the one or more transmitters is configurable to be associated with a particular object among a group of objects. The processor 410 is configured or programmed to cluster data from the plurality of transmitters, and further is configured to analyze the clustered data to determine one or more behavior patterns among the group of individuals.

FIG. 4 further illustrates one or more video sensing devices 440 that are connected to the processor 410. The processor 410 can be configured or programmed to associate data from the plurality of transmitters 430 and data from the one or more video sensing devices 440. In an embodiment, the association performed by the processor 410 includes identifying anomalies between data from the plurality of transmitters 430 and the data from the one or more video sensing devices 440. For example, in a correctional facility environment, video data may indicate that there are five individuals in the field of view of the video sensor, but the transmitter data may indicate only three transmitter identifiers in that area. (See FIG. 5, No. 505). This data indicates that one or more of the correctional facility residents has removed his RFID transmitter, and that the authorities can now act to remedy this situation. A database 450 can also be connected to the processor. The database 450 can store the data from the plurality of transmitters 430 and the data from the one or more video sensing devices 440.

Figure 5:
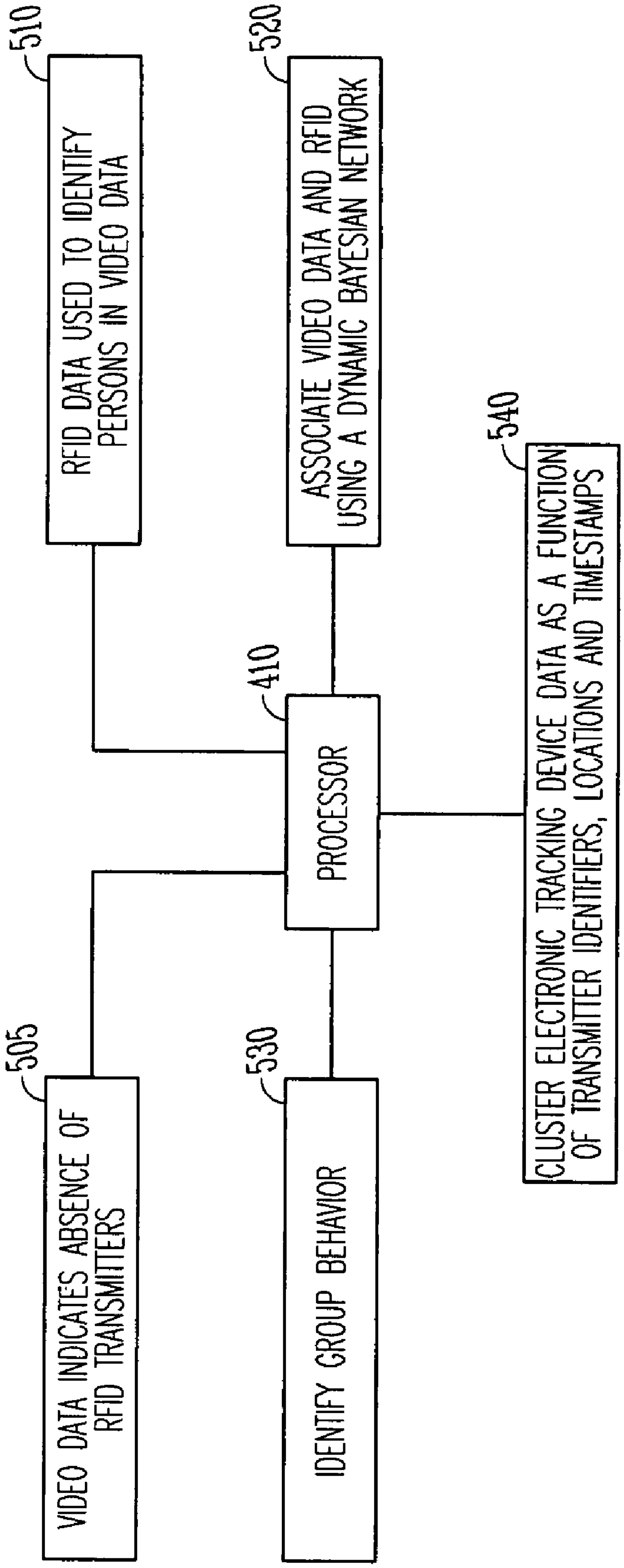
FIG. 5 illustrates several functions of an event detection system.

In another embodiment, as illustrated in FIG. 5, at 510, the processor is configured to first receive data from the one or more video sensor devices 440, then to receive data from the plurality of transmitters 430, and then to use the data from the plurality of transmitters 430 to identify a person in the data from the one or more video sensors. This feature can be used to supplement and/or replace video recognition algorithms. This feature can be particularly useful in environments in which the data from the video sensing devices are not clear, and identification by the video recognition algorithm is difficult.

FIG. 5 further illustrates at 520 that the association between the data from the plurality of transmitters 430 and the data from the one or more video sensing devices 440 is part of a dynamic Bayesian network. As disclosed above, FIG. 2 illustrates an example embodiment of such a dynamic Bayesian network 200. The dynamic Bayesian network 200 in FIG. 2 includes a complex event level 210, a first simple event level 220, and a second simple event level 230. The data in the first simple event level 220 and the second simple event level 230 normally originates from both the electronic tracking device 420 and the one or more video sensors 440. In an embodiment, the video sensing device 440 and the electronic tracking device 420 are configured to process data to generate a simple activity.

FIG. 5 further illustrates that at 530 the processor can be configured to identify group behaviors such as an illegal activity or an altercation between two or more people. For example, in a correctional facility environment, a video sensing device may identify two people coming together and exchanging an object, or more than two people coming together and each person receiving an object from one of the persons. This could indicate an exchange of contraband. This video data could be combined with the data from the electronic tracking device 420 to accurately identify the persons who are involved in this exchange. Similarly, video systems have been proposed that can identify a specific activity such as when two people are involved in a fight or other altercation. After the video system identifies such an altercation, the electronic tracking device 420 can be used to identify the particular individuals in the altercation. Other group activities that can be identified include an identification of the members of a group, an identification of a group leader, a change in an established pattern or activity of a group, a tracking of an object from a first individual to a second individual, and an entry into a restricted area by an unauthorized individual. FIG. 5 further illustrates at 540 that the processor 410 can be configured to cluster the electronic tracking device data as a function of one or more transmitter identifiers, transmitter locations, and transmitter timestamps.

Figure 6:
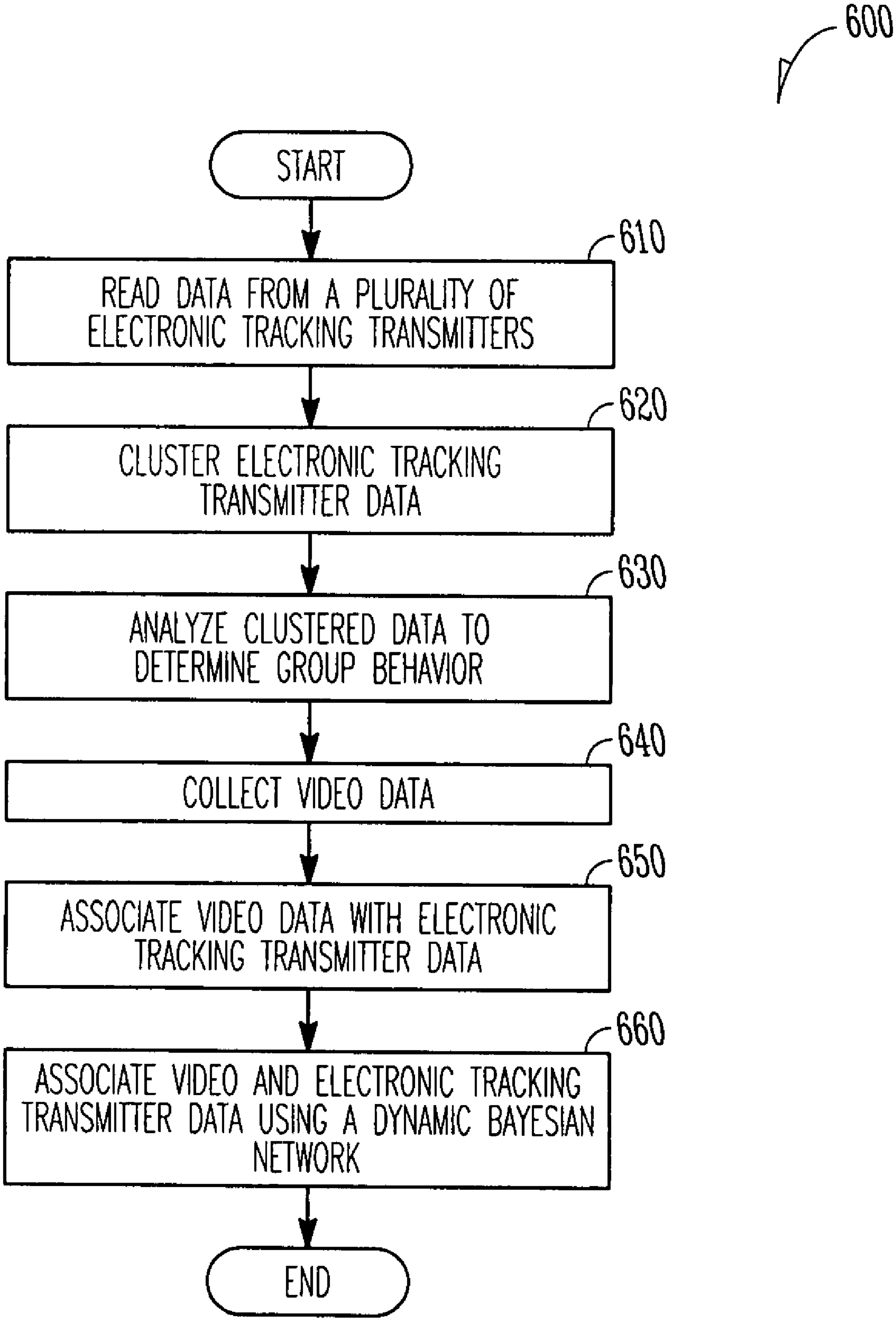
FIG. 6 illustrates an example embodiment of a process to detect events using electronic tracking data and/or video data.

FIG. 6 illustrates an example embodiment of a process 600 to use electronic tracking data and video data to identify events. At 610, data is read from a plurality of electronic tracking transmitters. Each of the electronic tracking transmitters is associated with a particular individual in a group of individuals. At 620, the electronic tracking transmitter data is clustered, and at 630, the clustered electronic tracking transmitter data is analyzed to determine a group behavior pattern associated with the group of individuals. In another embodiment, at 640, video data is collected, and at 650, the video data is associated with the electronic tracking transmitter data. At 660, the video data and the electronic tracking transmitter data are associated using a dynamic Bayesian network. The electronic tracking transmitter includes one or more of a radio frequency identification (RFID) device, an ultra wide band tracking device, a biometrics identification device, and a card-based identification device.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A system comprising:

a processor;

a radio frequency-based electronic tracking device, the electronic tracking device coupled to the processor;

one or more transmitters, the electronic tracking device configurable to read the one or more transmitters; and one or more video sensing devices, the one or more video sensing devices coupled to the processor, wherein the processor is configurable to associate data from the one or more transmitters and data from the one or more video sensing devices;

wherein each of the one or more transmitters is configurable to be associated with a particular individual of a group of individuals;

wherein the processor is configurable to cluster data from the one or more transmitters;

wherein the processor is configurable to analyze the clustered data to determine a group behavior pattern among the group of individuals;

wherein the association between the data from the one or more transmitters and the data from the one or more video sensing devices comprises a dynamic Bayesian network; and wherein the dynamic Bayesian network comprises a complex event level, a first simple event level, and second simple event level, wherein data in the first simple event level and the second simple event level originate from both the electronic tracking device and the video sensor.

2. The system of claim 1, wherein the processor is configurable to identify anomalies between the data from the one or more transmitters and the data from the one or more video sensing devices.

3. The system of claim 1, wherein the processor is configurable to first receive data from the one or more video sensors, then to receive data from the one or more transmitters, and then to use the data from the one or more transmitters to identify a person in the data from the one or more video sensors.

4. The system of claim 1, wherein the video sensor and the electronic tracking device are configurable to process data to generate a simple activity.

5. The system of claim 1, comprising a database, coupled to the processor, for storing the data from the one or more transmitters and the data from the one or more video sensors.

6. The system of claim 1, wherein the processor is configurable to use the data from the one or more transmitters and the data from the one or more video sensing devices for one or more of event monitoring, social behavior monitoring, and system self-learning.

7. The system of claim 1, wherein the group behaviors include at least one of an identification of an illegal activity and an altercation among two or more people.

8. The system of claim 1, wherein the data from the one or more transmitters is clustered as a function of one or more transmitter identifiers, transmitter locations, and transmitter timestamps.

9. The system of claim 1, wherein the group behavior patterns include at least one of an identification of the members of a group, an identification of a group leader, a change in an established pattern or activity of a group, a tracking of an object from a first individual to a second individual, and an entry into a restricted area by an unauthorized individual.

10. The system of claim 1, wherein the processor is configurable in an unsupervised learning mode to detect patterns in real-time operation.

11. The system of claim 1, wherein the electronic tracking device includes one or more of a radio frequency identification device, an ultra-wide band device, a biometrics identification device, and a card-based identification device.

12. A system comprising:

a processor;

a radio frequency-based electronic tracking device coupled to the processor;

one or more transmitters, the electronic tracking device configurable to read the one or more transmitters; and one or more video sensing devices, the one or more video sensing devices coupled to the processor, wherein the processor is configurable to associate data from the one or more transmitters and data from the one or more video sensing devices;

wherein each of the one or more transmitters is configurable to be associated with a particular object among a group of objects;

wherein the processor is configurable to cluster data from the one or more transmitters;

wherein the processor is configurable to analyze the clustered data to track one or more objects from the group of objects;

wherein the association between the data from the one or more transmitters and the data from the one or more video sensing devices comprises a dynamic Bayesian network; and wherein the dynamic Bayesian network comprises a complex event level, a first simple event level, and second simple event level, wherein data in the first simple event level and the second simple event level originate from both the electronic tracking device and the video sensor.

13. The system of claim 12, wherein the electronic tracking device and the one or more transmitters comprise one or more of a radio frequency identification (RFID) device, an ultra wide band tracking device, a biometrics identification device, and a card-based identification device.

14. The system of claim 13, wherein the processor is configurable to process and associate the data from the video sensing device and the clustered data from the one or more transmitters.

15. A process comprising:

reading data from a plurality of radio frequency-based electronic tracking transmitters, each electronic tracking transmitter associated with a particular individual in a group of individuals;

clustering the electronic tracking transmitter data;

analyzing the clustered electronic tracking transmitter data to determine a group behavior pattern associated with the group of individuals;

collecting video data; and associating the video data with the electronic tracking transmitter data;

wherein the associating the video data with the electronic tracking transmitter data comprises using a dynamic Bayesian network; and wherein the dynamic Bayesian network comprises a complex event level, a first simple event level, and second simple event level, wherein data in the first simple event level and the second simple event level originate from both the electronic tracking device and the video sensor.

* * * * *